United States Patent [19]

Rodal et al.

[11] Patent Number: 4,739,948
[45] Date of Patent: Apr. 26, 1988

[54] REEL SERVO CONTROL WITH RESONANCE DAMPING CIRCUIT

[75] Inventors: David R. Rodal, Palo Alto; Harold V. Clark, Los Altos, both of Calif.

[73] Assignee: Ampex Corporation, Redwood City, Calif.

[21] Appl. No.: 850,794

[22] Filed: Apr. 11, 1986

[51] Int. Cl.$^4$ .......................... B65H 77/00; H02P 1/54
[52] U.S. Cl. .................... 242/190; 242/75.51; 318/6
[58] Field of Search .............. 242/186, 75.5, 189, 242/75.47, 190, 75, 75.44, 75.3, 75.43, 75.51, 75.53, 75.52, 147 R, 197–200; 318/6, 7; 226/24, 42, 44; 360/71, 90, 84, 96.1, 73, 74.3, 96.3, 132, 85, 74.1, 83, 93

[56] References Cited

U.S. PATENT DOCUMENTS

| | | | |
|---|---|---|---|
| 3,718,289 | 2/1973 | Alaimo | 242/190 |
| 3,787,690 | 1/1974 | Neff | 242/190 X |
| 4,097,005 | 6/1978 | Sleger | 242/189 |
| 4,104,685 | 8/1978 | Chang | 242/190 X |

OTHER PUBLICATIONS

Television Engineering Handbook, K. Blair Benson, 1986, Section 15, Video Tape Recording-Servo Systems, pp. 15.108–15.109, McGraw Hill.

Primary Examiner—David Werner
Attorney, Agent, or Firm—Nat Kallman; George B. Almeida; Ralph L. Mossino

[57] ABSTRACT

In a tape transport apparatus, a first servo feedback loop is provided for correcting tape tension by adjusting the rotation of a tape reel in response to the sensed position of a tension arm that engages the moving tape. A second feedback loop senses the rate of change in the position of the tension arm and responsively damps the tension arm position changes by means of a lead circuit which causes a torque motor coupled to said pivotable arm to move in opposition to the tension arm position changes.

11 Claims, 2 Drawing Sheets

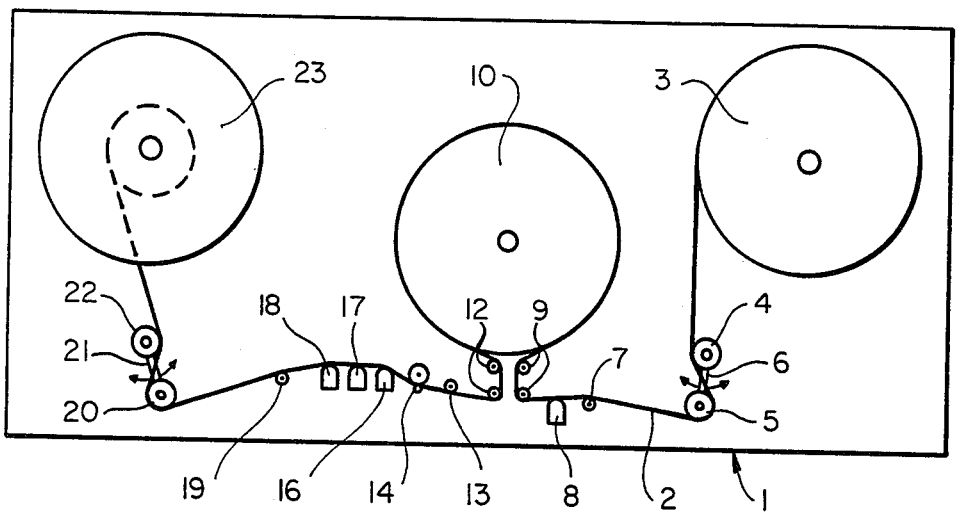
FIG_1
(PRIOR ART)
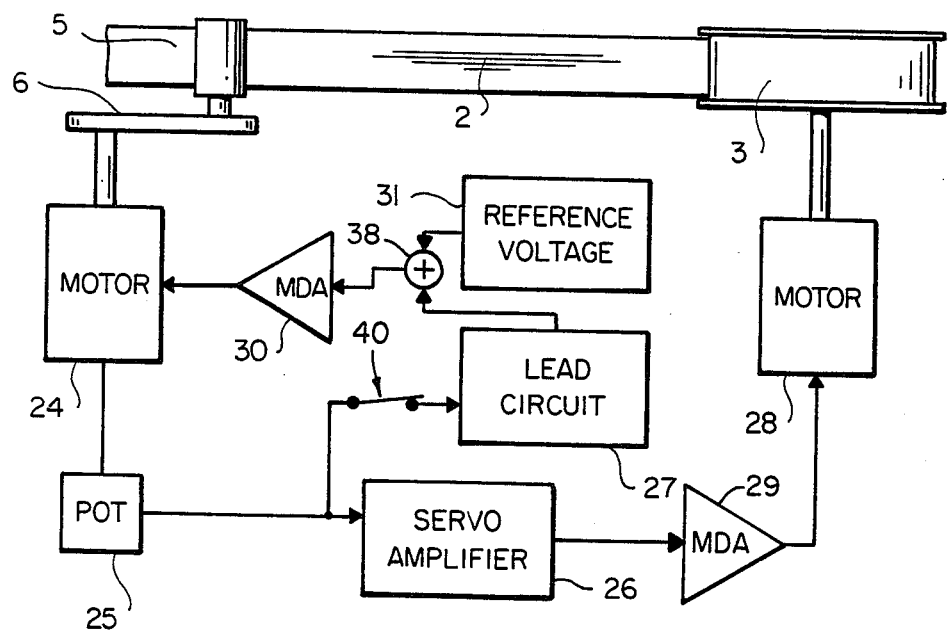
FIG_2.

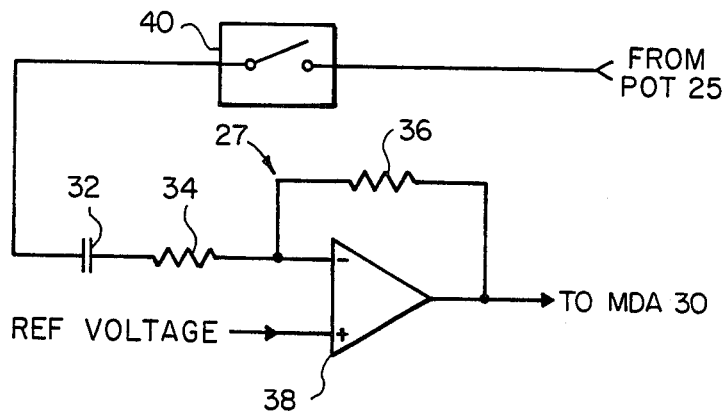
FIG_3
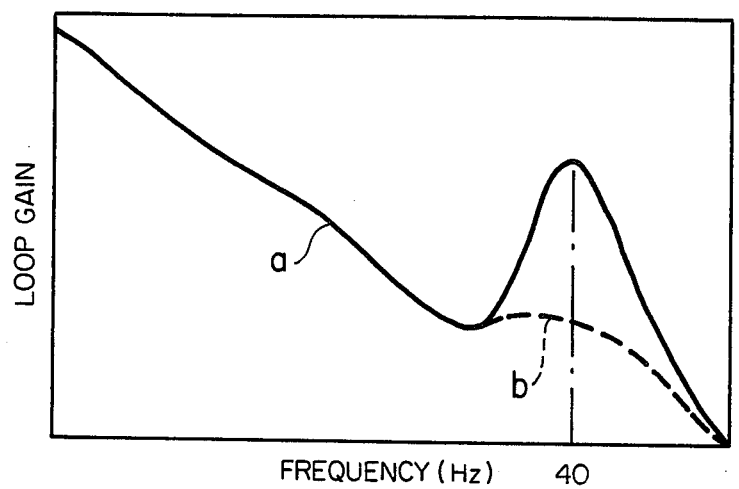
FIG_4

REEL SERVO CONTROL WITH RESONANCE DAMPING CIRCUIT

This invention relates to control of pay out and/or take up of tape transported along a defined path by a tape transport mechanism. More particularly, it relates to the transport of tape between tape storage reels under controlled tension conditions wherein resonances of a reel servo system as reflected in a tape tension sensing arm associated with the reel servo system are compensated electronically to achieve an extended useful gain and bandwidth range of servo control.

Magnetic record and/or reproduce machines include a magnetic tape that is transported along a path defined by a plurality of guides from a supply reel past a magnetic record and/or reproduce transducer or head to a takeup reel. The supply and takeup reels are driven by means of motors that are controlled by respective servo mechanisms to pay out or take up tape as demanded by the tape transport system, and in so doing, maintain an appropriate tension in the transported tape. It is desired to maintain a certain tape tension under most all conditions of tape transport, such as during record, reproduce and high speed shuttle operations. Unfortunately, the considerable inertia of reels of tape, tape tension control devices and other mechanisms involved in the transport of the tape in comparison with the inertia of the length of tape in the path between the reels make it virtually impossible for the reel drive to follow rapid changes in the demand of tape by the tape transport system.

To maintain the desired tension, a tape reel drive system often employs a pivotable compliance arm that functions to form a loop in the path of tape transport whose length is allowed to vary to absorb tape from, or deliver tape to, the tape transport mechanism during intervals when changes in tape demand can not be followed instantaneously by the reel drive. The compliance or tape tension sensing arm is typically arranged to cooperate with an arm position sensor, often a potentiometer, and a torque motor that drives an associated tape storage reel to servo control the pay out or take up of tape, as may be the case. Preferably, the tape transport mechanism is designed and reel servo control is exercised so that under steady state tape transport conditions the arm is at the center of its displacement range when the tape is transported with the desired tension in accordance with the tape demand of the transport mechanism. Thus, the tape tension sensing and control is arranged to develop an error signal representing the extent and direction of displacement of the compliance arm from its nominal position, hence, the tape loop length. Moreover, the design of the arm mechanism and associated apparatus of reel servo system is such that tape tension is approximately constant throughout the normal displacement range of the arm. Thus, application of the error signal to a servo mechanism associated with the driven tape reel causes pay out or take up of tape to return the arm, hence, associated loop of tape to their nominal positions, while at the same time maintaining the desired tape tension. Ordinarily, the applied error signal accomplishes this by controlling the torque delivered by the motor to drive the tape reel with which the compliance or tension sensing arm is associated.

One problem that is encountered in controlling the transport of tape under controlled tape tension conditions is the occurrence of resonances in tension arm and other mechanisms influencing the transport of the tape along the desired path. The presence of such resonances can frustrate the exercise of the desired control of pay out or take up of tape by the tape storage reels. Such resonances are determined by the characteristics of the system, such as tape elasticity, the mass of the tension sensing arm, the tension arm spring, and other energy storage elements of the system. Moreover, many of these characteristics are dynamic in nature, i.e., change with time and operating conditions. Consequently, the response characteristic of the system frequently changes, which results in shifting the frequencies of the resonances. For example, during tape shuttle operations, the frequencies of resonances are influenced by compressible layers of air trapped between the tape layers wound on a take up reel. The presence of layers of air reduces the speed of response of the system, thereby lowering the frequencies of resonances of the system. The extent of such reduction or lowering depends upon the amount of air trapped between the layers of tape. Furthermore, the amount of air trapped between the layers of tape varies with the speed at which the tape is wound on the reel. Therefore, the change in the response characteristic, hence, frequencies of resonances of the system, often varies with the tape speed operating condition of the tape transport mechanism.

Prior tape drive systems employ dashpots to dampen the resonances. However, dashpots are bulky and expensive, and require additional circuitry and monitoring, which adds to the expense of maintenance and operation of the tape transport drive system. In other existing systems, the gain and bandwidth of the reel servo system are made sufficiently small to preclude the effects of resonances. Furthermore, the gain and bandwidth are usually set low enough to allow for changes in frequencies of resonances without introduction of instabilities in the control of tape transport. However, when operating at low system gains and with low system bandwidths, resolution and performance are adversely affected.

Therefore, advantages will be realized by the provision of a simple, compact reel servo system for controlling the transport of tape between tape storage reels under controlled tension conditions wherein resonances of the reel servo system are compensated electronically to achieve an extended useful gain and bandwidth range of servo control.

In accordance with the present invention, a method and system for controlling the transport of tape between tape storage reels under controlled tension conditions is achieved through suppression of the tendency of a reel servo system to oscillate unduly as a result of spurious resonances that may occur, particularly during high speed shuttle operations when tape pay out and take up with respect to the tape storage reels is at high rates. The reel servo system typically comprises a first feedback circuit including a tape tension servo loop coupled to control the tape reel drive motor, and a second feedback loop circuit coupled to electronically dampen resonances that occur in the reel servo system. The first feedback loop includes means for sensing the position of a tape tension sensing arm to develop an error signal which is coupled to a servo means to vary the speed and phase of the tape pay out or take up by a tape reel, as may be required. In accordance with the invention, the second feedback loop herein includes a lead circuit which senses the rate of change of the position of the tension arm. The second feedback loop acts to change the torque applied by a torque motor to the tape tension sensing arm in a manner which resists any high rate of change of arm position. The two feedback loops serve to maintain the desired tape tension and compensate the reel servo for spurious resonances that occur in the system.

The invention will be described in greater detail with reference to the drawings in which:

FIG. 1 is a schematic diagram of a tape transport in which the present invention may be employed;

FIG. 2 is a block diagram of a circuit means used in a tape transport for electronically damping resonances in a reel servo system, in accordance with this invention;

FIG. 3 is a schematic and block diagram of a lead circuit which is incorporated in the circuit means of FIG. 2; and FIG. 4 is a plot of the reel servo loop gain against frequency illustrating the resonance of a tension arm as experienced in prior art reel servo control systems, and includes a modified plot, in a dashed line, showing the damping of resonance achieved in accordance with the present invention.

With reference to FIG. 1, a conventional helical scan tape record and reproduce transport apparatus 1 includes a tape 2 that is supplied from a reel 3 driven by a motor 28 (FIG. 2). The tape 2 passes around a guide 4 and is formed into a loop by a guide 5 carried at one end of a compliance arm or tape tension sensing arm 6, which is pivotable for accurate movement. The loop extends from the tension guide 5 to a second guide 7, from which the tape 2 passes to a pair of entrance guides 9. These guides serve to guide the entry of the tape into a desired helical path around a cyclindrical tape guide drum 10. The exit of the tape 2 from the tape guide drum is defined and controlled by a pair of exit guides 12. A rotatable magnetic transducer or head is driven around the periphery of the drum to scan the tape 2 along a multiplicity of parallel tracks that extend diagonally across the width of the tape.

The tape 2 proceeds from exit guides 12 past a guide 13 and a capstan 14. The tape path then extends to and passes around another guide 19 that defines one end of another loop in the tape path. The length of the this loop is sensed by a guide 20 mounted at one end of a pivotable tape tension sensing arm 21. The tape path then proceeds around a guide 22, which is coaxial with the pivotable arm 21, and the tape 2 is taken up or wound on a reel 23. Along the path of travel of the tape 2 between the two reels 3 and 23 are disposed various erase, audio and control track heads 8, 16, 17 and 18 for performing various record and reproduce functions typically associated with the operation of helical scan tape record and reproduce apparatus.

For the sake of simplicity, various controls and motors for the heads, the capstan, the takeup reel and other parts of the record and reproduce apparatus have been omitted. It should be understood although the description is directed generally to one type of tape transport apparatus, the present invention is generally applicable to tape transports wherein resonances are associated with a reel servo system including a tape tension sensing arm.

In order to control the transport of the tape 2, while maintaining a desired tension in the tape, the length of the loops engaged by the tape guides of the tape tension sensing arms 6 and 21 are monitored and the energization of the motors for the supply and takeup reels is controlled accordingly. With reference to the supply reel 3, for example, any increase or decrease in tension of the tape between the supply reel 3 and the capstan 14 will cause the tension sensing arm 6 to pivot as a result of the tape being engaged by the guide 5 at the end of the arm 6. The pivoting movement is usually resisted by a restoring spring (not shown). The length of the tape loop formed by each tape tension control mechanism is monitored by sensing pivoting movement of the tape tension sensing arm associated with the tension control mechanism. In response to this sensing, a corresponding error control signal is generated for servo control of the associated reel to vary the rotation of the reel and restore the tape tension arm position to its desired nominal location, typically at the center of the arm's displacement range.

With reference to FIG. 2, a reel servo system for controlling the pay out and take up of tape while maintaining a desired tension in the transported tape 2 is depicted. In accordance with the present invention, the reel servo system includes a tension sensing arm 6 coupled to a controlled torque motor 24, which provides part or all of the torque that determines the desired tape tension. A potentiometer 25 that is connected to the torque motor 24 senses the angular position of the motor shaft, which corresponds to the position of the tension sensing arm 6, and provides a voltage representative of the motor shaft, hence tension arm position, to a servo amplifier 26 and to a lead circuit 27. The servo amplifier serves to generate an error signal related to the position of the tape tension sensing arm 6 that causes a motor drive amplifier 29 to vary the current delivered to a reel motor 28 that drives the tape reel 3. The variation of applied torque serves to mainintain the tape tension at a desired value while the tape 2 is transported at a desired speed.

In order to dampen undesirable resonances or oscillations in the reel servo system, and thereby maintain proper control of the transport of the tape, a feedback loop is provided that includes a lead circuit 27 coupled (via a switch 40 described below) to the output of the tension arm position sensing apparatus provided by the potentiometer 25. When the reel servo system enters a condition of unstable oscillation as a result of a system resonance, the angular position of the tension sensing arm 6 changes at the frequency of oscillation. The potentiometer 25 responsively provides a signal indicative of arm position change to the lead circuit 27. The lead circuit provides a voltage output indicative of the rate of change of the position of the tension arm 6, which is coupled to a summing circuit 38 for combining with a reference voltage provided by a reference voltage source 31. The reference voltage source 31 is arranged to provide a voltage signal corresponding to that required to maintain the tape at the desired tension for a particular operating condition of the tape transport apparatus, with the tape tension sensing arm 6 centered within its displacement range. The summing circuit 38 combines the output voltage provided by the lead circuit 27 with the reference voltage to thereby form an error correction signal, represented by the voltage signal provided by the lead circuit 27, that is applied to an associated motor drive amplifier 30. This amplifier responsively generates a corresponding corrective motor current drive signal that causes the motor 24 to produce a torque delivered to the tension sensing arm 6 of a magnitude and in a direction which opposes the oscillation of the tension sensing arm. As a result, the tension sensing arm 6 is displaced in opposition to the oscillatory motion produced by the resonant condition of the reel servo system. This opposing displacement is sensed by the potentiometer 25, which responsively delivers to the servo amplifier 26 a voltage signal corresponding to the opposing displacement. The servo amplifier responsively generates an error signal that causes the motor 28 to drive the reel 3 in opposition to the forces acting on the reel servo system that produce the unstable oscillations in the transport of the tape 2. In this way, unstable mechanical perturbations of the transport of the tape caused by resonances are virtually eliminated electronically.

It is particularly desirable to dampen the effects of reel servo system resonance when the tape transport apparatus is operated to shuttle the tape 2 at high speeds between the tape storage reels 3 and 23. As described hereinbefore in this operating mode, compressible layers of air are trapped between the tape layers wound on the take up reel. The presence of layers of air reduces the speed of response of the reel servo system, thereby, lowering the frequencies of resonances of the system, with the extent of such reduction or lowering depending upon the amount of air trapped between the layers of tape. This reduction of response of the reel servo system can result in shifting one or more of the reel servo system resonant frequencies so as to render the reel servo system subject conditions of unstable operation. As will be described further hereinafter, the lead circuit 27 is particularly helpful in preventing such happening so that an extended useful gain and bandwidth range of reel servo system stable operation can be maintained even with a reduced response condition. In some applications, the lead circuit 27 may only be required to dampen the effects of reel servo system resonance in certain operating modes, such as high speed tape shuttle. For such applications the selection switch 40 is included at the input of the lead circuit 27 to enable selective damping control of the reel servo system. When placed in a mode where resonant damping is desired, a system controller (not shown) responsive to an operator control closes the switch 40 to activate the lead circuit 27 in the servo loop of the tension arm motor 24. At other times, the switch 40 is opened to disable the lead circuit 27 so that the fixed voltage provided by the reference voltage source 31 is permitted to control the tension arm position as the tape 2 is transported from the supply reel 3 to the tape reel 23 under the control, for example, of the capstan 14. During such tape transport operations, the motor 24 is operated in a fixed torque mode, whereby a constant tape tension is maintained through the operation of the servo amplifier 26, motor drive amplifier 29 and reel motor 28.

As illustrated in FIG. 3, the lead circuit 27 receives a signal from the potentiometer 25 of the arm position sensing apparatus that is applied to a capacitor 32. Whenever the tension arm 6 changes its position in response to a change in the angular position of the shaft of motor 24, a corresponding signal change is applied to the capacitor 32. The capacitor transmits the AC component and blocks the DC component of the arm position signal. The circuit formed by the capacitor 32, a resistor 36 and operational amplifier 38 constitute a high pass filter, which has a time constant determined by the values of the components to provide the desired phase lead. The circuit formed by the capacitor 32, the resistor 34 and the operational amplifier 38 provide a desired phase lag at higher frequencies. The values of the components are selected to provide the designed phase lead over the frequency band of interest, namely, a band extending over a frequency range of expected resonant frequencies, and a phase lag at higher frequencies to avoid the effects of noise. The output of the lead circuit 27 is applied to the input of motor drive amplifier 30, as previously described. The operational amplifier 38 also performs the function of the previously described summing circuit 38 (FIG. 2), and, therefore, is arranged to add the arm position signal received from the potentiometer 25 to the reference voltage provided at its input terminal coupled to the reference voltage source 31 (FIG. 2).

The ratio of the values of resistances 34 and 36 to the reactance of the capacitor 32 establishes the extent of gain. The capacitive reactance associated with the capacitor 32 decreases with the increase in frequency of the signal received from the tension arm position sensor or potentiometer 25. When the resistance of the resistor 34 is greater than the capacitive rectangle, the gain is determined by resistors 34 anc 36. When the capacitive reactance is greater than the resistance of resistor 34, the gain is determined by the ratio of the resistance of resistor 36 to the capacitive reactance of the capacitor 32, which provides the desired phase lead. In this way, a varying error signal is obtained which correlates to the amplitude and frequency of the movement of the tension arm, hence, the reel servo system. The corresponding error signal is coupled to the motor drive amplifier 30, which responsively delivers a current to the motor 24 to suppress and negate the undesired resoance of the reel servo system.

It should be understood that one or more lead circuits may be used to cover specified frequency bands that relate to different resonant requencies of the reel servo system.

FIG. 4 is a graph represnting reel servo loop gain against frequency. The solid line of FIG. 4 illustrates the effect of resonance on the reel servo system. Typically, these resonant frequencies occur over a range of 10 to 100 Hz, The dashed line Of FIG. 4 indicates the improvement realized by damping resonances in the reel servo system by use of the lead circuit 27 described herein.

By virtue of employing a lead circuit in a closed feedback reel servo loop having a tape tension arm sensing apparatus, a simple, compact and inexpensive means is provided to suppress the effect of resonances associated with the control of a tape reel drive system. Moreover, these effects are suppressed by the circuit arrangement of the present invention over a range of frequencies determined by lead circuit 27. Consequently, the circuit arrangement of the present invention permits the useful gain and bandwidth range of the reel servo system, even for controlling the transport of tape 2 under conditions which may cause a change in the response characteristics of the tape transport mechanism.

It should be understood that although a preferred embodiment of the present invention has been illustrated and described in the foregoing, various modifications thereof will become apparent to those skilled in the art. Accordingly, the scope of the present invention is not intended to be limited other than by the appended claim and its equivalence.

What is claimed is:

1. A tape transport apparatus including a tape reel for supplying tape, a pivotable tension arm for engaging the tape, and means coupled to said arm for varying the torque applied to said arm, the apparatus comprising:
   a first circuit network for varying the rotation of said tape reel in response to a tension arm position deviation; and
   a second circuit network selectively coupled to the first circuit network, for sensing the rate of change in the position of the tension arm in the presence of oscillatory deviations, and for actuating said torque varying means in response to said rate of change in arm position to oppose said oscillatory deviations in the position of said arm.

2. A tape transport apparatus as in claim 1, including an arm position sensing means coupled to said tension arm for providing a signal representative of said rate of change in the angular position of said tension arm.

3. A tape transport apparatus as in claim 2, wherein said sensing means comprises a torque motor for applying the deviation opposing torque to said tension arm to counter said rate of change of position, and a potentiometer coupled to the torque motor for providing the signal representative of the rate of change in the angular position of said tension arm.

4. A tape transport apparatus as in claim 1, wherein said second circuit network comprises lead circuit means for generating an error signal relating to the rate of change in the position of said tension arm.

5. A tape transport apparatus as in claim 4, wherein said second circuit network further includes a motor drive amplifier coupled between said lead circuit means and said torque motor.

6. A tape transport apparatus as in claim 4, wherein said lead circuit means comprises a capacitive reactance circuit and a gain stage.

7. A tape transport apparatus as in claim 4, wherein said lead circuit means comprises a plurality of lead circuits, each lead circuit operating over a different frequency band, and a switching means for connecting said lead circuits to control said tension arm when the position of said tension arm is subject to oscillatory deviations.

8. A tape transport apparatus as in claim 4 wherein said lead circuit means includes a reference circuit for providing a reference voltage for combining with the signal representing the rate of change of position of said tension arm and said lead circuit means generate an error signal indicative of the rate of change in position of said tension arm.

9. A tape transport apparatus as in claim 1, wherein said second circuit network provides a tension arm position correction signal which oppose said oscillatory deviations in the position of said tension arm.

10. A tape transport apparatus as in claim 2 wherein:
    said first circuit network comprises a tension servo loop including, a motor means for rotating said tape reel, and a servo circuit means for generating an error signal which varies the rotation of said motor means to regulate the tension of the tape coupled to said reel; and
    said second circuit network comprises a torque servo loop coupled to said arm position sensing means and including, lead circuit means for sensing any relatively rapid rate of change in the position of the tension arm and for varying the torque applied to the tension arm in a manner which resists the relatively rapid rate of change in arm position.

11. A tape tension control system for a tape transport comprising:
    a tape reel for supplying tape;
    a pivotable tension arm for engaging said tape and being responsive to tension in said tape;
    means for sensing the angular position of said tension arm;
    a first feedback loop comprising a motor means for rotating said tape reel, and a servo means coupled to said sensing means for generating a tape tension error signal, said servo means coupled to said motor means for varying the drive applied by said motor means in response to said tape tension error signal; and
    a second feedback loop comprising a torque motor having a shaft coupled to said tension arm, and a lead circuit means coupled to said sensing means for developing a signal indicative of oscillatory deviations in position of said tension arm, for varying the torque provided to the tension arm by said torque motor to oppose said oscillatory deviations in position of said tension arm.

* * * * *

UNITED STATES PATENT AND TRADEMARK OFFICE
CERTIFICATE OF CORRECTION

PATENT NO. : 4,739,948

DATED : April 26, 1988

INVENTOR(S) : David R. Rodal et al

It is certified that error appears in the above-identified patent and that said Letters Patent is hereby corrected as shown below:

Column 6, line 21, delete "rectangle", insert --reactance--;
          line 22, delete "anc", insert --and--;
          line 36, delete "requencies", insert --frequencies--;
          line 38, delete "represnting", insert --representing--;
          line 42, delete "Of", insert --of--.

Signed and Sealed this

Twenty-seventh Day of December, 1988

Attest:

DONALD J. QUIGG

*Attesting Officer*      *Commissioner of Patents and Trademarks*